United States Patent [19]

Niu et al.

[11] Patent Number: 5,631,111
[45] Date of Patent: May 20, 1997

[54] METHOD FOR PRODUCING COLOR FILTERS

[75] Inventors: Chao-Wen Niu, Hsinchu; Hsien-Kuang Lin, Taipei; Hua-Chi Cheng, Hsinchu; Pao-Ju Hsieh, Keelung, all of Taiwan

[73] Assignee: Industrial Technology Research Institute, Hsinchu, Taiwan

[21] Appl. No.: 588,962

[22] Filed: Jan. 19, 1996

[51] Int. Cl.⁶ .................................................. G02B 5/20
[52] U.S. Cl. ................................................................ 430/7
[58] Field of Search .......................... 430/7, 321; 357/68, 357/79

[56] References Cited

U.S. PATENT DOCUMENTS

| | | | |
|---|---|---|---|
| 4,786,148 | 11/1988 | Sekimura et al. | 350/339 |
| 4,802,387 | 2/1989 | Williams | 74/812 |
| 4,820,619 | 4/1989 | Sanada et al. | 430/197 |
| 4,837,098 | 6/1989 | Shimamura et al. | 430/7 |
| 5,085,973 | 2/1992 | Shimizu et al. | 430/271 |
| 5,214,541 | 5/1993 | Yamasita et al. | 359/891 |
| 5,214,542 | 5/1993 | Yamasita et al. | 359/891 |
| 5,420,708 | 5/1995 | Yokoyama et al. | 359/68 |

FOREIGN PATENT DOCUMENTS 60-023831  2/1985  Japan.

Primary Examiner—John A. McPherson
Attorney, Agent, or Firm—W. Wayne Liauh

[57] ABSTRACT

An improved method is disclosed for making color filters via electrodeposition or lithographic electrodeposition of a plurality of colored resins onto an electrically conductive substrate. The method comprises the steps of: (a) forming a black-hued pattern on the substrate; (b) dividing the substrate into an intended zone and a conjugate zone, the intended zone being portions of the substrate to be deposited with the colored resins and the conjugate zone being portions of the substrate not to be deposited with the colored resins; (c) forming a permanent insulation film on the conjugate zone of the substrate; and (d) electrodepositing the colored resins onto the intended zone of the substrate. The photosensitive insulation resin is preferably a negative photosensitive resin containing: (i) a resin binder containing a carboxyl (COOH) group; (ii) 1–15 wt %, based on the weight of the resin binder, of a photopolymerization initiator; and (iii) 30–100 wt %, based on the weight of the resin binder, of a photo-reactive monomer or oligomer each containing at least two unsaturated double bonds.

16 Claims, 8 Drawing Sheets

METHOD FOR PRODUCING COLOR FILTERS

FIELD OF THE INVENTION

The present invention relates to a method for making color filters for use in a variety of light-receiving surfaces such as LCD devices, color video cameras, or the like. More specifically, the present invention relates to an improved method for making color filters which involves simplified manufacturing procedures, provides improved smoothness, and reduces the amount of effort required for treating solvent waste that may be produced in conjunction therewith.

BACKGROUND OF THE INVENTION

With the rapid growth of the information industry and the continuous breakthroughs in the development of display technology, a trend is now becoming increasingly recognizable that flat panel displays (FPD), which take up much smaller space, are gradually taking over the place currently occupied by the traditional cathode ray tubes (CRT). Among the various flat panel displays, liquid crystal displays (LCD), because of their light weight, small thickness, low driving voltage required, and low energy consumption, have assumed a leading position. Another reason for the wide popularity of LCDs can also be attributed, at least in part, to the rapid development of the technologies that LCDs have been associated with. More recently, with the successful development of thin film transistors (TFT), LCDs now have acquired the capability of becoming a full-color display ready for a much broader consumer market. This development further enhances the already immense potential of LCDs.

With both the multi-color and full-color LCDs, chroma control and brightness control are the two most important elements. These elements are provided by a high-gray level (black-and-white) LCD, color filter films, and backlight devices. Of these elements, color filters provide the most important role for color control.

A color filter comprises three main components: a black-hued (i.e., black-colored) matrix, a color filter layer, and an overcoat. Currently, at least five methods have been disclosed in the prior art for making color filters. These include:

(1) dyeing,
(2) etching,
(3) pigment dispersion,
(4) electrodeposition, and
(5) printing.

The dyeing method and the etching method primarily utilize an appropriate arrangement of dyes to prepare color filters. A wide variety of dyes have been taught in the prior art references. Many of which provide homogeneous chroma, high dyeability, and allow a wide selection of compatible resins for which desired color intensity and light transmissibility can be provided. U.S. Pat. No. 4,820,619, the content thereof is incorporated herein by reference, a photosensitive composition is disclosed for use in preparing a color filter which contains a copolymer of glycidyl (meth) acrylate or glycidyl (α-methyl)vinyl ether with a (meth) acrylic amide or ester having a quaternary ammonium salt structure, and an aromatic azide as a photosensitizer. U.S. Pat. No. 4,837,098, the content thereof is incorporated herein by reference, discloses a colored filter layer comprises three groups of filter picture elements having spectral characteristics respectively corresponding to red, green, and blue. Each group of filter picture elements (R, G, B) are made of polyimide resin and dye contained therein.

Because of the relatively inadequate light and heat resistances of the dyeing materials, the methods of dyeing and etching discussed above have been largely replaced by the pigment dispersion method and/or the electrodeposition method, both of which utilize pigments that exhibit superior light and heat resistances. In these methods, pigment particles are uniformly dispersed in a resin matrix. Typically, the pigment particles are controlled to have a particle size less than 0.2 μm so as to ensure reliable coloring characteristics. U.S. Pat. No. 5,085,973, the content thereof is incorporated herein by reference, discloses a color filter prepared by providing red, green, and blue image elements, each imaging element comprising a photosensitive resin and a pigment, and a black matrix on a transparent glass substrate. The photosensitive resin is formulated such that it comprises a polyfunctional acrylate monomer, an organic polymer binder and a photopolymerization initiator comprising a 2-mercapto-5-substituted thiadiazole compound, a phenyl ketone compound, and 2,4,5-triphenylimidazolyl dimer composed of two lophine residues combined to each other through intermediation of a single covalent bond. U.S. Pat. No. 4,786,148, the content thereof is incorporated herein by reference, discloses a color filter comprises a substrate and colored resin films, including blue, green, and red resin films containing blue, green, red colorant particles, respectively. The average particle volumes of the blue, green, and red colorants are set that the blue particles are greater than the green particles, which are further greater than the red particles. The pigment method is also disclosed in, for example, Japan Laid-Open Patent Publication JP60-129739. With the pigment dispersion method, lithographic techniques can be utilized to improve resolution, increase the flexibility of pattern design, and form color filters that can be used in TFT-LCDs. However, the conventional pigment-related methods typically involve a relatively complex process, and they require at least three photomasks which must be precisely aligned to ensure good quality. Furthermore, because the pigment dispersion method involves a free radical reaction to form a thermoset resin, a protective layer is required so as to avoid contact with oxygen.

With the electrodeposition coating processes, a transparent electrode is prepared by patterning a transparent electrically conductive film (typically an indium-tin oxide, or ITO) which is deposited on a substrate and serves as an electrode, and an electric voltage is applied only to a portion of the patterned transparent electrode which is to be dyed in the same color. The substrate is then immersed in a coloring electrodeposition bath containing appropriate polymers and pigment dispersed in water, and a colored layer is formed by electrodeposition. Thereafter, electric voltage is applied only to another portion of the substrate which is to be dyed in a different color, and the substrate is then immersed in another colored electrodeposition bath for forming a different color layer via electrodeposition. This procedure is repeated until all the desired colored layers are formed. The disadvantages of the electrodeposition coating process are that it is necessary to perform a high precision patterning of the transparent electrode, and to pay meticulous attention during the subsequent process not to break the fine pattern, because otherwise, the subsequent coloring process will be rendered very difficult. The electrodeposition coating processes typically are limited to the preparation of color filters for use in STN-LCDs.

Among all the processes for preparing color filters, the printing process is the least expensive process. However, it suffers the problems of having poor dimensional precision, smoothness, and reliability, and is not well accepted by the industry for making high quality electronic products.

By combining the pigment dispersion method and the electrodeposition coating methods, Nippon Oil Company proposed an electrodeposition lithographic method (ED-litho) for making color filters. In U.S. Pat. No. 5,214,542, the content thereof is incorporated herein by reference, Nippon Oil disclosed an electrodeposition lithographic method, which involves the steps of (a) forming a photosensitive coating film on a transparent electrically conductive layer provided on an outermost surface of a substrate having an alignment film, (b) exposing the photosensitive coating film to light through a mask having patterns of at least three different degrees of light transmittances; (c) developing and removing a photosensitive coating film portion registering with one of the patterns of smallest and largest degrees of light transmittances to expose the transparent electrically conductive layer; (e) electrodepositing a colored coating on the exposed electrically conductive layer to form a colored layer thereon, and (f) repeating the step (e) for the respective patterns of different degrees of light transmittances in sequence of difference in light transmittances to form different colored layers, respectively. U.S. Pat. No. 5,214,541, the content thereof is incorporated herein by reference, discloses the additional step of transcribing the colored layers, the transparent electrically conductive layer, and the alignment film onto another substrate.

The electrodeposition lithographic method discussed above has several advantages in that: (1) high precision patterns can be obtained, better than that obtainable from the electrodeposition coming method; (2) the pattern figure has a high degree of freedom, and both stripe and non-stripe patterns can be provided; (3) because it utilizes the advantageous characteristics of electrodeposition process, the coated films exhibit uniform film thickness and excellent smoothness.

In both the electrodeposition and the electrodeposition lithographic methods, the colored resins are electrically deposited on an electrically conductive layer formed on a transparent glass substrate (which is conventionally called an ITO layer, or simply ITO, although it could be made from a different material). As a result, the conductive part(s) of the ITO must be continuous in order to conduct current thereto. However, in order to accommodate the design of the colored patterns, the ITO must not be ubiquitously continuous, i.e., some portions of the ITO must be isolated from each other. During the assembly of the LCDs, the contacting surfaces must be extremely smooth. And the provision of an insulation layer in order to form these separate ITO regions can cause manufacturing problems.

First, a flat panel LCD screen is formed by superimposing the color filter with another flat glass panel with an adhesive layer typically arranged in the shape of a rectangular frame called "adhesive frame region". If the adhesive frame region has colored resin deposited thereon, because the mechanical strength of the colored resin is substantially weakened by the large amounts of pigments contained therein, the overall strength of the adhesion between the color filter and the flat glass panel will be degraded accordingly. Second, the flat glass panel and the color filter must closely parallel each other, and any unlevelness in the thickness of the adhesive layer would adversely affect this parallelness. The existence of any undesirably deposited colored resin on the adhesive frame region could cause the thickness of the adhesive layer to vary by as much as 2–3 μm, thus severely breaching the stringent requirement on the levelness of the adhesive frame and greatly affecting the quality of the LCD panel.

In order to ameliorate these problems, it has been suggested to form a solvent-soluable and/or mechanically-peelable insulation film, via an adhering or printing procedure, onto the ITO prior to the electrodeposition of the colored resins. After the completion of the electrodeposition process, the insulation film is then dissolved by an appropriate solvent, and/or is peeled off using a robotic arm. This process is dictated by the peelability of the insulation film, and it must be operated without causing any damage to the electrodeposited layers. Additionally, the extra step of peeling off the insulation film greatly complicates the manufacturing process and increases the manufacturing cost. The use of the solvent to peel off this insulation film also causes the clean room to be subject to an undesirably additional round of possible contamination, as well as causing an undesired solvent disposal problem that is inevitably associated therewith.

The insulation film can also be coated on the ITO using a screen printing device. However, the screen printing device typically does not meet the stringent in-line layout requirement of a high quality clean room, in addition to the environmental pollution problem associated with solvent evaporation. Furthermore, the resolution provided by a screen printing process does meet the level required in making color filters.

SUMMARY OF THE INVENTION

The primary object of the present invention is to develop an improved method for making color filters for use in light receiving surfaces such as LCDs. More specifically, the primary object of the present invention is to develop an improved method for making high quality color filters with simplified manufacturing procedures, improved smoothness, and reduced spent solvent disposal.

The improvement disclosed in the present invention is characterized by the steps of (1) coating a photosensitive film on an electrically conductive glass substrate, followed by (2) masked exposure, (3) solvent development and (4) curing, to thereby form a permanent insulation layer on regions of the electrically conductive glass substrate that are not intended to be electrodeposited with color resins. In a preferred embodiment of the present invention, the curing step is operated in two stages: a soft-baking at a relatively low temperature and a hard-baking at a relatively higher temperature. The photosensitive permanent insulation material for use in the present invention must have excellent mechanical strength, high hardness, and excellent smoothness.

The process disclosed in the present invention provides the following advantages:

(1) The steps of masked exposure and solvent development are consistent with the traditional methods of making color filters, and there exist abundant mature technologies for carrying out these steps with causing environmental concerns.

(2) There is no need to peel off the insulation film as required in the prior art processes; this also results in a decreased rate of rejection associated with damages caused to the color filters including the substrate as a result of such peeling off process.

(3) This process eliminates the weak spots related to inadequate mechanical strength and/or hardness that exist in the prior art process as a result of unwanted deposition of colored resins on the adhesive frame region; thus excellent mechanical strength and hardness can be ensured with the process disclosed in the present invention.

(4) The permanent insulation film of the present invention can provide an augmented smoothness to the color filter so produced. Traditionally, color filters prepared with electrodeposition process using elongated lined patterns have a difference in thickness of about 0.4 to 0.8 μm between extreme edges. This difference, which can result in unlevelness in the LCD panel, can be minimized or eliminated with a properly designed permanent insulation film disclosed in the present invention.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses an improved process for making color filters for use in light receiving surfaces such as LCDs which allows simplified manufacturing procedures, provides improved smoothness, and reduces spent solvent disposal. The process disclosed in the present invention includes the steps of (1) coating a photosensitive film on an electrically conductive glass substrate, (2) subjecting the photosensitive film to a masked exposure, (3) developing an intended pattern using a developer solvent, and (4) curing the remaining portions of the photosensitive film to form a permanent insulation layer on regions of the electrically conductive glass substrate that are not intended to be electrodeposited with color resins (i.e., the conjugate region). In a preferred embodiment of the present invention, the curing step is operated in two stages: a soft-baking at a relatively low temperature and a hard-baking at a relatively higher temperature. The photosensitive permanent insulation material for use in the present invention should have good mechanical strength, high hardness, and provide good smoothness.

The process disclosed in the present invention provides the following advantages: (1) the steps of masked exposure and solvent development are consistent with the traditional methods of making color filters, and there exist abundant mature technologies for carrying out these steps with causing environmental concerns; (2) there is no need to peel off the insulation film as required in the prior art processes; this also results in a decreased rate of rejection associated with damages caused to the color filters including the substrate as a result of such peeling off process; (3) excellent mechanical strength and hardness can be ensured with the process disclosed in the present invention because it eliminates the weak spots which may exist as a result of unwanted deposition of colored resins on the adhesive frame region; (4) the permanent insulation film of the present invention can also impart an augmented smoothness to the color filter so produced.

In the process disclosed in the present invention, the color filters can be formed using either the electrodeposition method or the electrodeposition lithographic method. Either way, the method disclosed in the present invention is consistent with the technologies that have been developed for making color filters. Thus, excellent precision can be ensured and significant improvement obtained without incurring large expenses in personnel training or acquiring additional equipment.

Figure 1A:
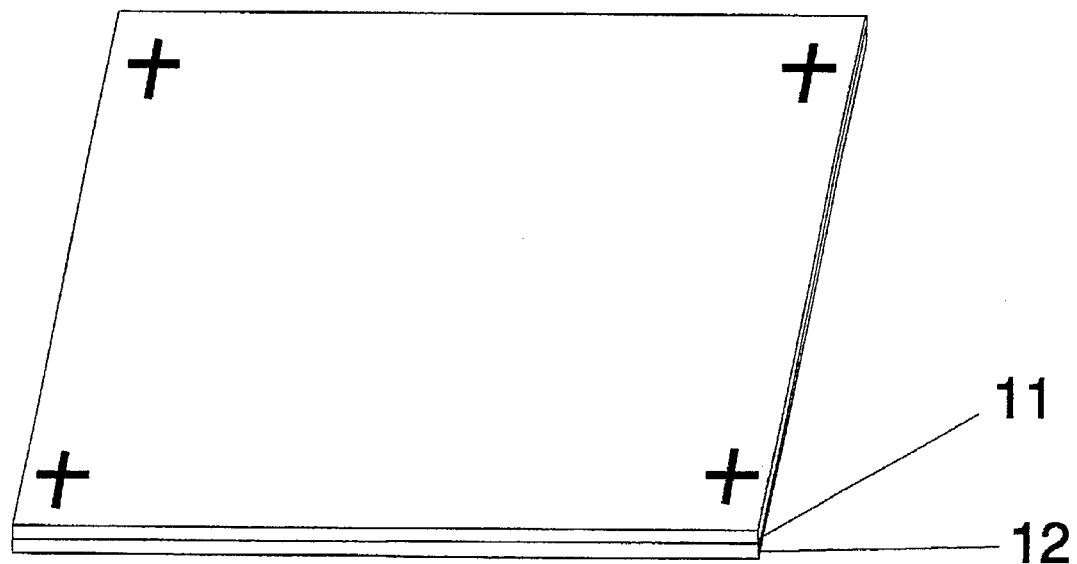
FIGS. 1A through 1F are schematic diagrams showing the various stages according to a first preferred embodiment of the process disclosed in the present invention which utilizes the electrodeposition lithographic method.
Figure 1B:
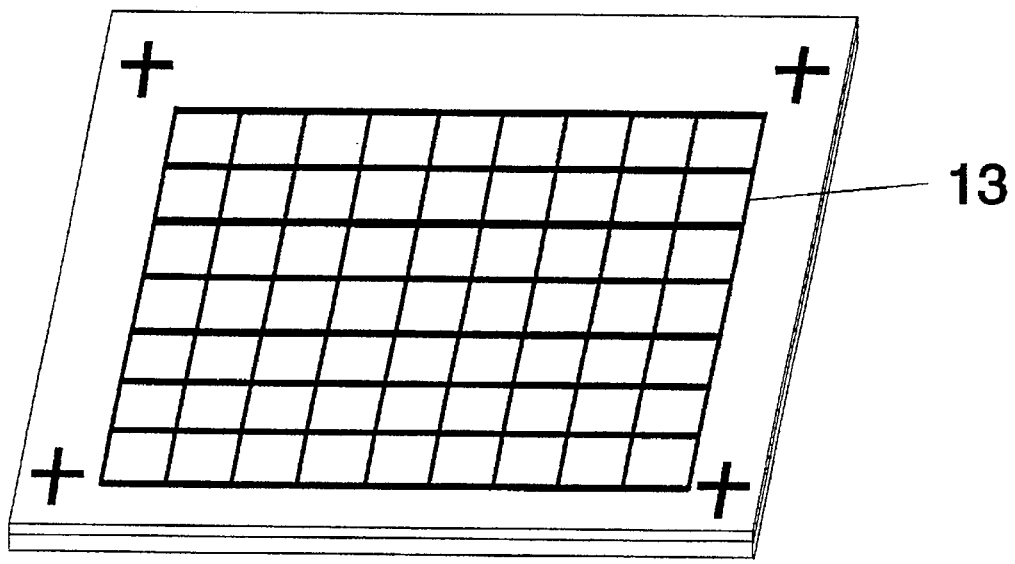

FIGS. 1A through 1F illustrate the steps of forming color filters according to a first preferred embodiment of the process disclosed in the present invention which utilizes the electrodeposition lithographic method. FIG. 1A shows an electrically conductive glass substrate, which includes an ITO layer 11 formed on a transparent glass 12. In FIG. 1B, it is shown a black-hued pattern 13, which includes a black matrix, a rectangularly shaped outer frame, and alignment marks as well as other necessary marks, is formed on the ITO layer 11. The black-hued pattern 13 can be formed directly using a black-hued positive or negative photo-curable resin, followed by masked exposure and solvent development.

Alternatively, the black-hued pattern 13 can be formed indirectly by coating the ITO layer 11 with a positive or negative photoresist layer, followed by masked exposure and solvent development to reveal a conductive pattern intended for the black matrix. Then, a cationic black-hued resin is electrodeposited onto the revealed portions of the ITO layer 11. After the removal of the photoresist, the electrodeposited black-hued resin is heated at 50°–120° C., preferably at 60°–90° C. (soft baking), then at 150°–300° C., preferably at 180°–230° C. (hard baking), to become fully cured. In yet another alternative embodiment, the black-hued pattern 13 can also be formed by electrodepositing chromium, nickel, or an alloy thereof, onto the revealed portions of the ITO layer 11.

Figure 1C:
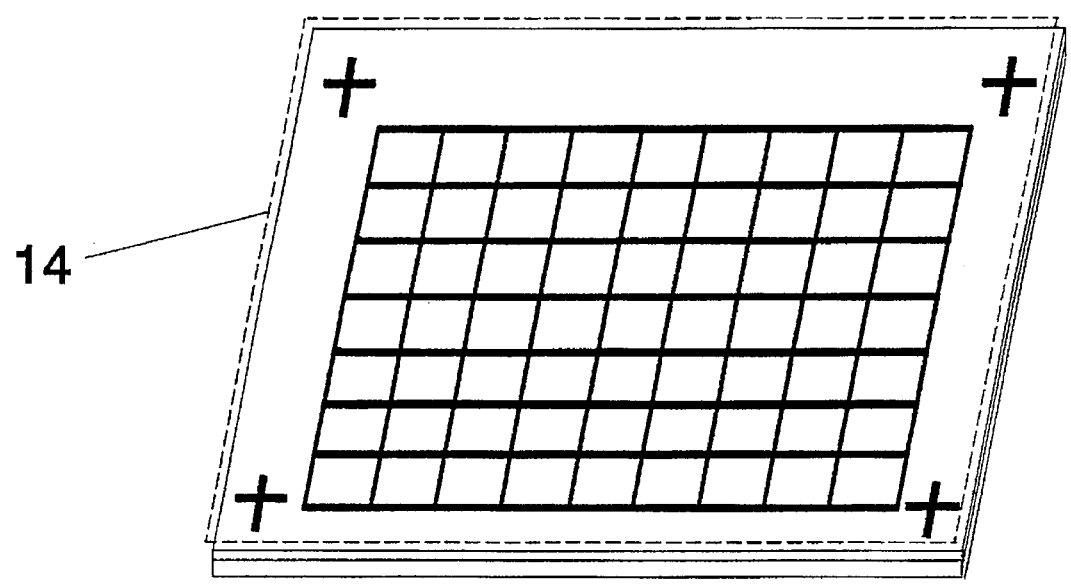

FIG. 1C shows that an insulation film 14 is formed on the portions of the ITO layer 11 which are not intended to be deposited with colored resins. Similar to the formation of the black-hued pattern 13, the insulation film 14 is formed by coating the ITO layer 11 including the black-hued matrix with a photosensitive photo-curable insulation resin, followed by masked exposure and solvent development to reveal the "un-intended" pattern (which is the "conjugate" of the intended colored patterns, i.e., the portions of the ITO layer that are not intended to be deposited with any colored resin). The remaining insulation resin containing the desired conjugate pattern is heated at 50°–120° C., preferably at 60°–90° C. (soft baking), then at 150°–300° C., preferably at 180°–230° C. (hard baking), to become a permanent insulation film covering the portions of the ITO layer 11 not intended to be covered by color resins. The permanent insulation preferably should have a thickness of about 0.2–3 μm, more preferably about 0.8–2.0 μm, and a hardness (pencil) between 2H–8H, more preferably between 3H–5H.

Figure 1D:
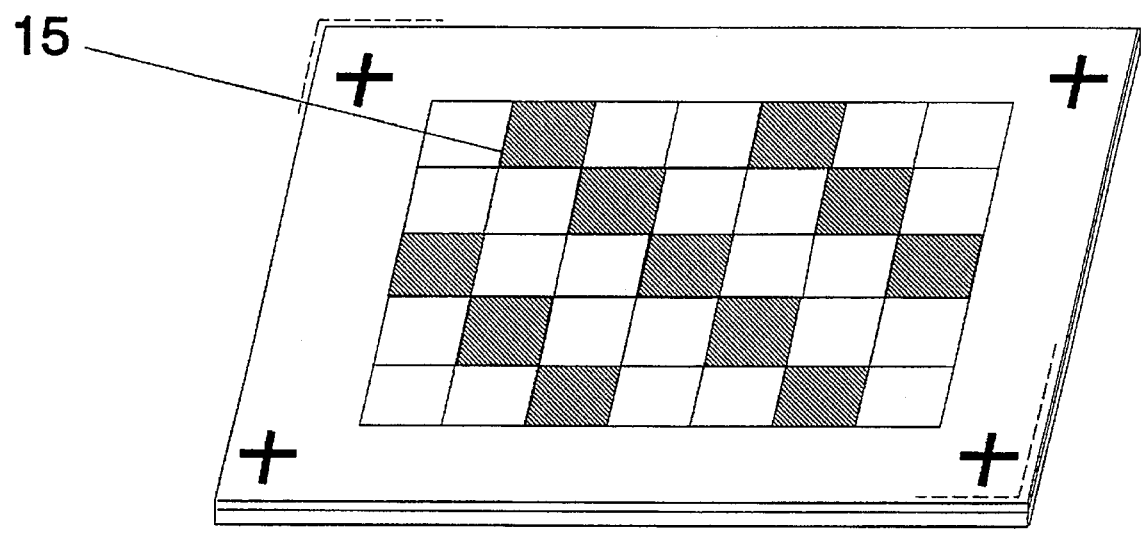
Figure 1E:
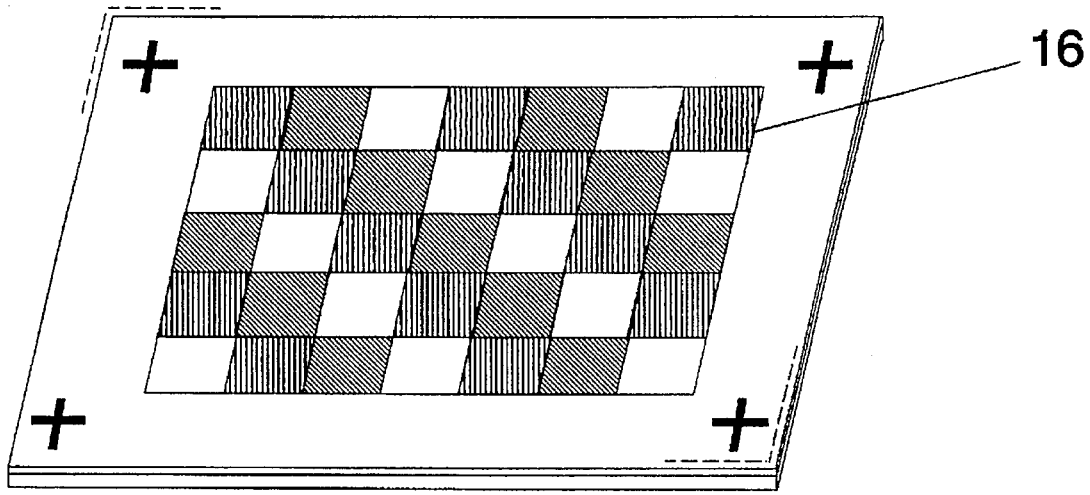
Figure 1F:
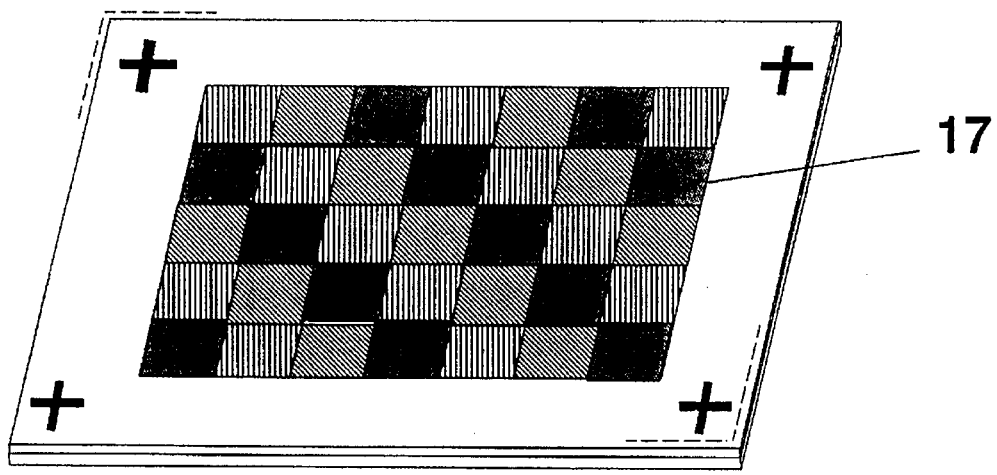
Figure 2A:
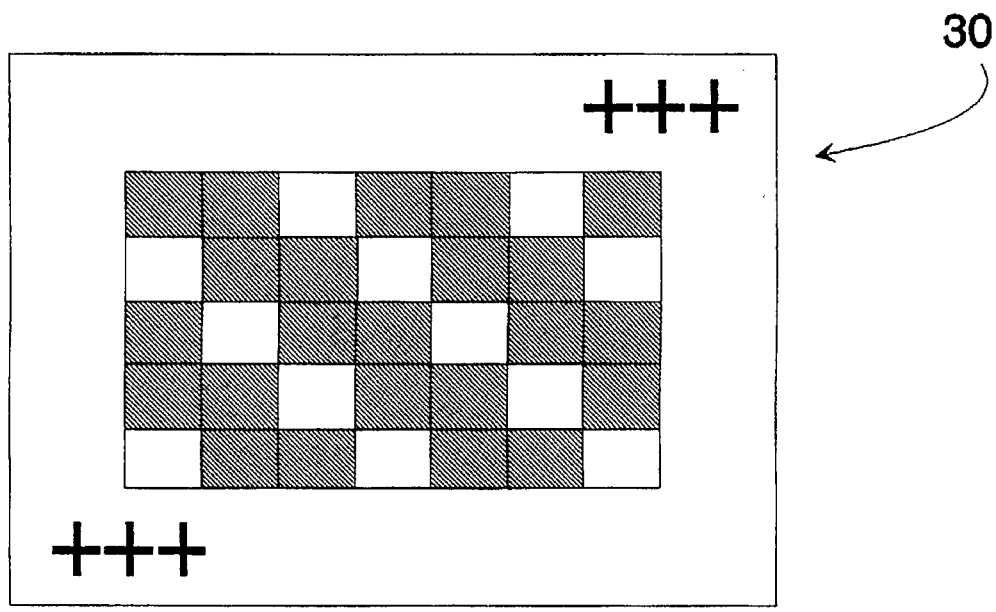
FIGS. 2A and 2B are a schematic diagrams of a single-exposure photomask and a multiple-exposure photomask, respectively, which can be utilized to produce regions of varying levels of photo exposure on the photoresist by precise movements thereof.
Figure 2B:
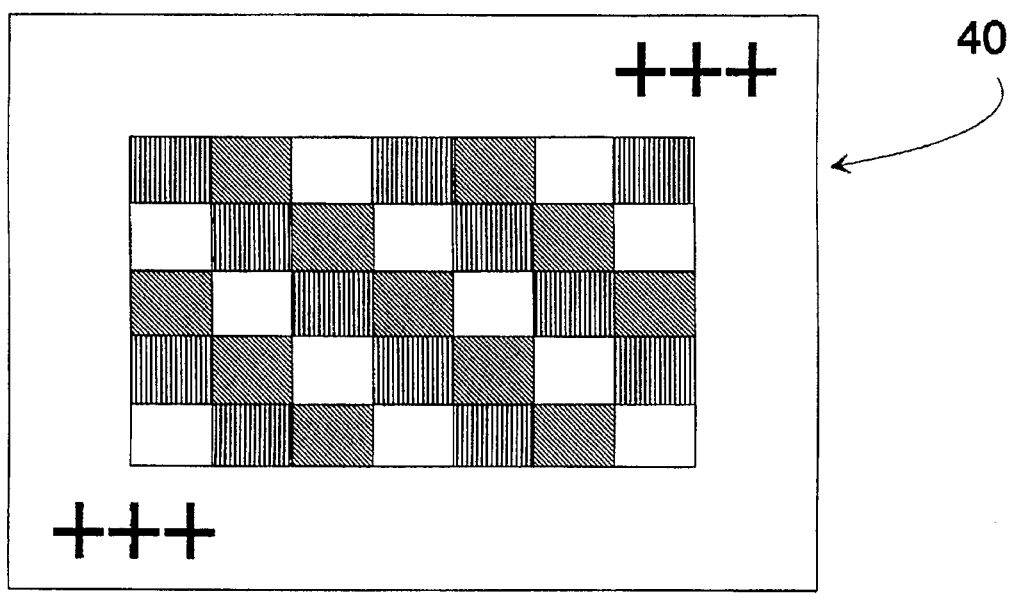

FIGS. 1D through 1F, respectively, show the formation of three colored layers (e.g., red, green, and blue) 15, 16, and 17 on the ITO layer 11 using the electrodeposition lithographic process. These colored layers are formed by first coating a multiple-development (at least three levels) positive photoresist on the ITO 11. The photoresist is then subject to three different degrees of photo exposure in various intended regions thereof. This various degrees of exposure on the photoresist can be achieved by a multiple exposure process using precise movements of a single-stage photomask as shown in FIG. 2A. During each exposure, the photoresist is subject to a different exposure energy, and the multiple exposure causes regions of different degrees of exposure energy to be formed on the photoresist. Alternatively, the photoresist can be subject to a single exposure process utilizing a multi-level (in this case, three levels of exposure) photomask as shown in FIG. 2B. The photomask provides three different levels of energy exposure so as to form regions of three different degrees of exposure energy on the photoresist. Preferably, the three levels of exposure energy are 50–300 mJ/cm$^2$, 350–600 mJ/cm$^2$, and 650–1,000 mJ/cm$^2$, respectively, or more preferably, 50–120 mJ/cm$^2$, 350–450 mJ/cm$^2$, and 650–750 mJ/cm$^2$, respectively.

After the multiple-extent exposure, the glass substrate was developed with a 0.05–0.3 wt % developer solution to develop the portion thereof that has received the highest amount of exposure energy and reveal a corresponding region on the ITO layer. Then a cationic first colored resin is electro deposited onto the revealed ITO layer, followed by soft-baking at 50°–120° C., preferably at 60–90° C., to form the first colored resin layer 15. The second and third colored layers, 16, 17, are formed using the same procedure, except that the concentrations of the developer solution are at 0.4–0.8 wt % and 0.9–1.5 wt % baked at 150°–300° C., preferably at 180°–250° C.

After all the three colored layers are formed on the ITO layer, a protective film is formed on the entire substrate by applying a coating of heat-curable transparent resin, followed by soft baking and hard baking at above described temperatures, respectively. It is preferred that the protective film has a pencil hardness between 2H–8H, preferably between 3H–5H, and a thickness between 0.5–3 μm, preferably between 0.5–2 μm.

The above steps describe the process using the electrodeposition lithographic method for making color filters according to a first preferred embodiment of the present invention. In the present invention, the color filters can also be made using the electrodeposition method. This second preferred embodiment is illustrated in FIGS. 3A through 3E and described in more detail below.

Figure 3A:
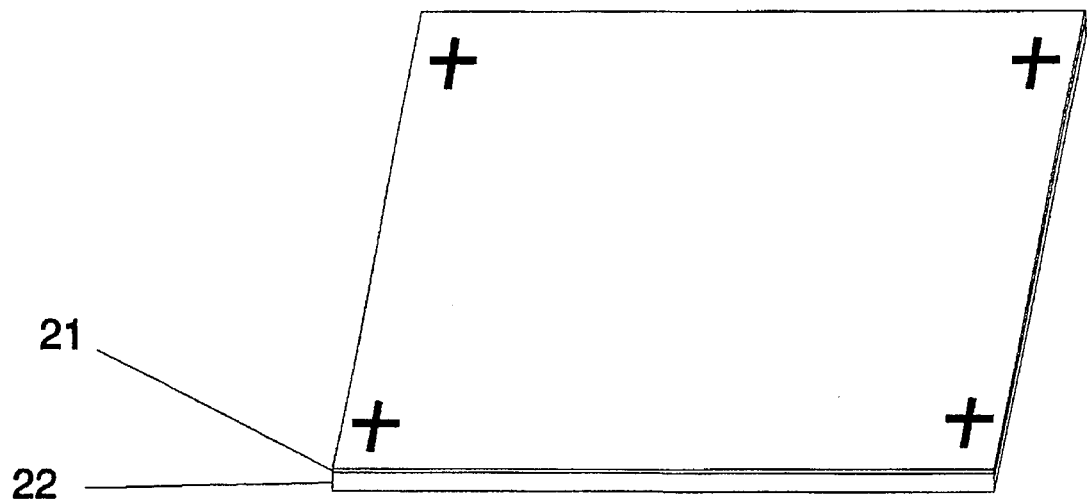
FIGS. 3A through 3E are schematic diagrams showing the various stages according to a second preferred embodiment of the process disclosed in the present invention which utilizes the electrodeposition method.
Figure 3B:
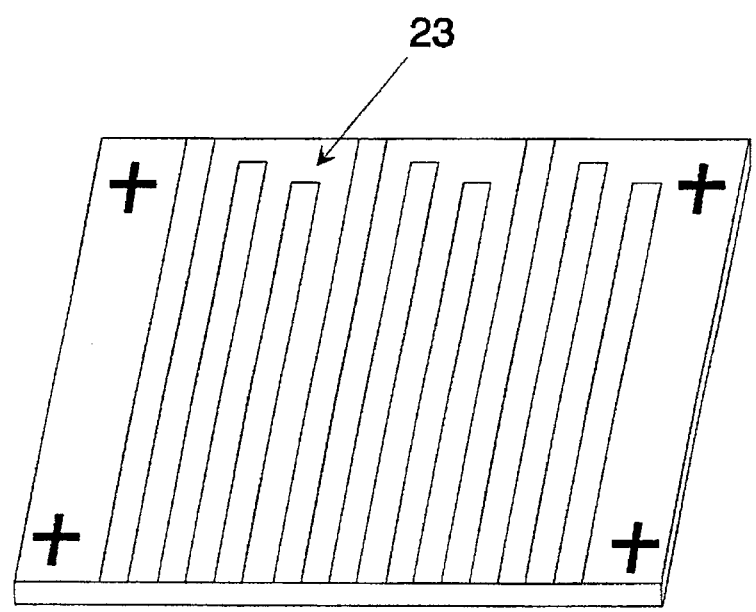

A positive or negative photoresist layer is formed on a transparent glass substrate as shown in FIG. 3A which contains an ITO layer 21 on a glass substrate 22. After masked exposure and subsequent development, a lined pattern (i.e., a multiple-lined pattern) and alignment marks remain on the photoresist layer. The revealed portion of the ITO layer 21 is removed by etching with an acidic solution (HNO$_3$/HCl/H$_2$0=100/200–500/200–600, by volume). Thereafter, the remaining photoresist is removed by washing off with a basic solution or an organic solvent (such as ketone, toluene, etc.). This causes only the lined pattern 23, which contains a plurality of separated long ITO strips each for separately conducting electric current therethrough without communicating with adjacent lines, and the alignment marks 24 to remain on the ITO layer 21, as shown in FIG. 3B.

Figure 3C:
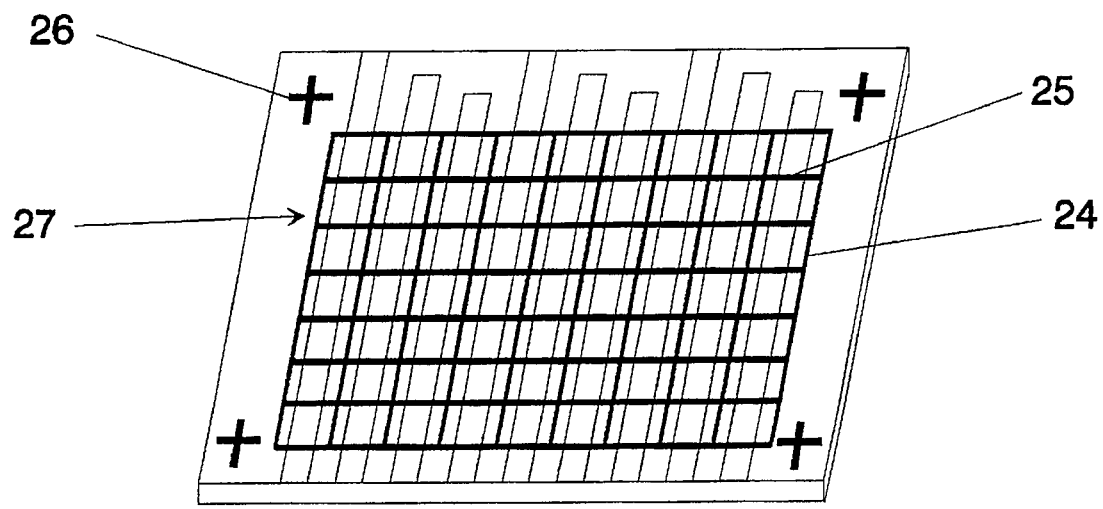

After the lined pattern 23 is formed on the ITO layer 21, a black-hued negative photoresist, such as Black 301 made by JSR Co, Japan, is coated on the ITO layer 21. After alignment, masked exposure and development, a black-hued layer 27, which contains a black frame 24, a black matrix (i.e., a latticed pattern) 25, and black alignment marks 26, is formed overlaying the lined pattern 23 of the ITO layer 21, as shown in FIG. 3C. The black layer 27 is soft-baked and hard-baked to become cured.

Figure 3D:
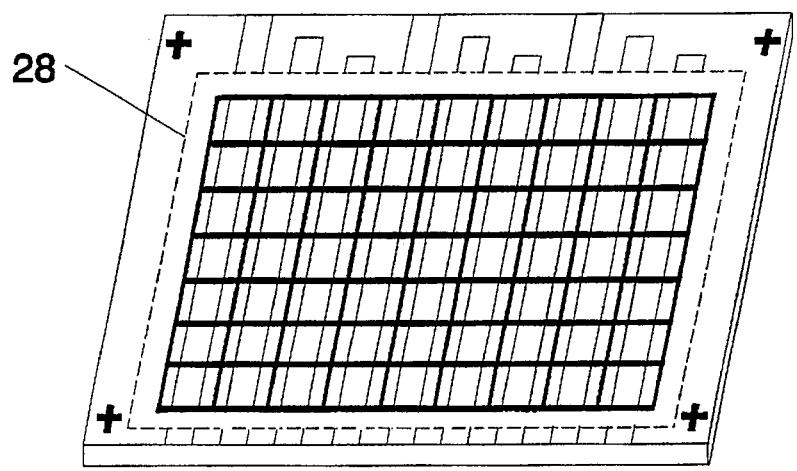

FIG. 3D shows that an insulation film 28 is formed on the conjugate portions of the ITO layer 21 not intended to be deposited with colored resins. The insulation film 28 is formed by coating the entire ITO layer 21 including the black-hued matrix (with or without the black frame) with a photosensitive photo-curable insulation resin, followed by masked exposure and solvent development to reveal the conjugate or un-intended pattern (i.e., the portions of the ITO layer that are not intended to be deposited with any colored resin). The remaining insulation resin containing the desired conjugate pattern is heated at 50°–120° C., preferably at 60°–90° C. (soft baking), then at 150°–300° C., preferably at 180°–230° C. (hard baking), to become a permanent insulation film covering the conjugate portions of the ITO layer 21 not intended to be covered by any color resin. The permanent insulation preferably should have a thickness of about 0.2–3 μm, more preferably about 0.8–2.0 μm, a hardness (pencil) between 2H–8H, more preferably between 3H–5H.

Figure 3E:
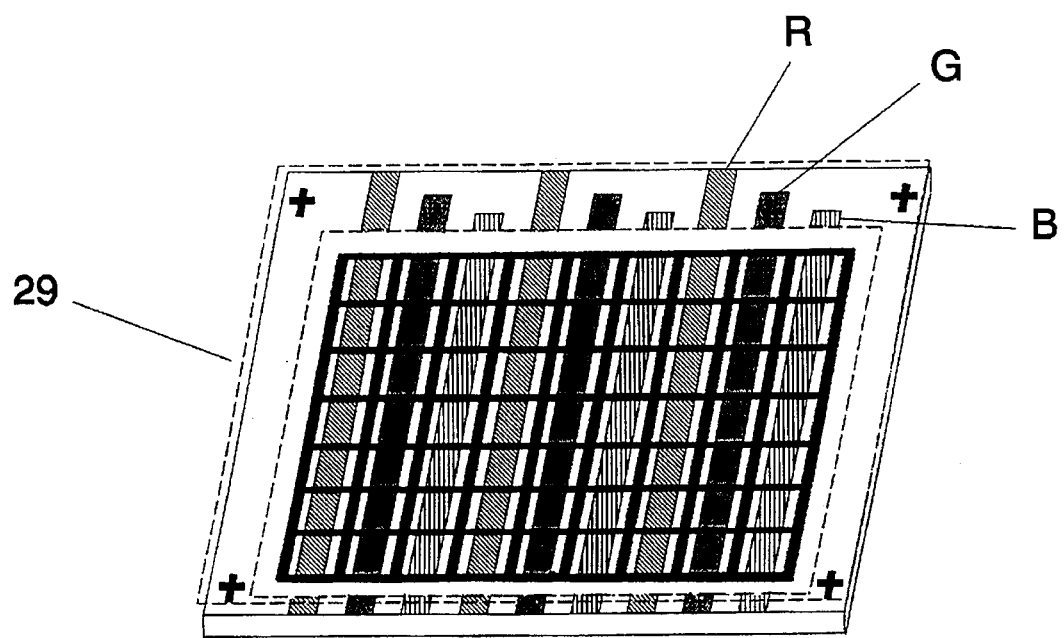

After the permanent insulation film 28 is formed overlaying the black layer 27 and the ITO layer 21, anionic or cationic color resins can be electrodeposited on the lined pattern 23 of the ITO layer 21 in separate steps. After soft baking and hard baking, a color filter is formed, as shown in FIG. 3E. After all the three colored layers are formed on the ITO layer, a protective film is formed on the entire substrate by applying a coating of heat-curable transparent resin, followed by soft baking and hard baking at above described temperatures, respectively. It is preferred that the protective film has a pencil hardness between 2H–8H, preferably between 3H–5H, and a thickness between 0.5–3 μm, preferably between 0.5–2 μm.

In the steps described above, the photoresist, insulation film, black photoresist, and protective film are preferably formed using a spinning coating procedure. A number of other techniques can also be used; these include spraying, dip coating, screen printing, roll coating, etc.

In the first preferred embodiment which utilizes the electrodeposition lithographic technique, in order to accommodate the preparation of the color pixels and the black matrix, the regional pattern of varying light exposures on the positive photoresist can be stripe or non-stripe (such as mosaic or triangle, etc.). It is preferred that the three levels of energy exposure to be provided on the photoresist are 100–40%, 85–20%, 70–0%, or more preferably 100–70%, 70–40%, and 40–0%, respectively, of the amount of energy exposure required for full development.

A positive photoresist works based on the principle that its solubility increases after it is exposed to photo energy, thus becoming capable of being developed by a basic solution. Typically, a positive photoresist contains a novolac resin and a photosensitive quinonediazide compound. However, combinations of other resins and/or photosensitive compounds can also be used. The photoresist for use in the present invention preferably should have high contrast, so as to minimize the film loss (in terms of film thickness) in the unexposed or underexposed areas. Many positive photoresists can be used in the present invention, including: (1) conventional positive photoresists; (2) positive electrodeposition photoresists; and (3) dyed or pigment-dispersed positive photoresists. Preferably, the photoresists are that which require a full exposure energy of 80–1,500 mJ/cm².

The developer solution used in the present invention preferably contains a basic substance, such as sodium carbonate, sodium hydrogen carbonate, sodium metasilicate, tetraalkyl ammonium hydroxide, sodium hydroxide, potassium hydroxide, and mixtures thereof. Preferred concentrations of the developer solution range from 0.2 to 4 wt %, and the preferred conditions for developing the exposed areas of the photoresist are at 15° to 40° C., for 5 to 600 seconds.

The colored electrodepositing resin comprises a light-curable charged resin and an appropriate coloring agent (red, green or blue) dispersed therein. The charged photo-curable resin can be an anionic or cationic resin. Preferably, the colored resins are cationic colored resins comprising a cationic charged acrylic resin containing a tertiary or quaternary amine solubilized and/or dispersed in a neutralizing agent such as formic acid, acetic acid, propionic acid, or lactic acid. The cationically charged acrylic resins can be selected from the group consisting of N,N,-dimethyl acrylamine, diethyl aminoethyl acrylate, diethyl aminoethyl methacrylate, diethyl aminoethyl methacrylate, dimethyl aminoethyl acrylate, dimethyl aminoethyl methacrylate, and t-butylamino ethyl methacrylate. In addition to cationic colored resins, anionic colored resins can also be used. The anionic colored resins contain an anionic charged resin, a photosensitive monomer (typically a monomer containing at least an unsaturated double bond), a photopolymerization initiator (0.1–30%), solvent, and water. Preferably, the anionic resin can be an acrylic resin that contains an acid group (carboxylic or sulfonic group) solubilized and/or dispersed in ammonia, trimethylamine, diethylamine, dimethyl ethanol amine, and/or diethyl ethanol amine.

The coloring agent for use in the present invention can be a dye, pigment, or a mixture thereof. Typically, an appropriate dye can be selected from the group consisting of azo dyes, anthraquinone dyes, benzodifuranone dyes, condensed methine dyes, and mixtures thereof. The pigment can be selected from the group consisting of azo lake organic pigments, anthraquinacridone organic pigments, phthalocyanine organic pigments, isoindolinone organic pigments, anthraquinone organic pigments, thioindigo organic pigments, chrome yellow, chrome blue, iron oxide, chrome vermilion, chrome green, ultramarine, prussian blue, cobalt green, emerald green, titanium white, carbon black, and mixtures thereof. A dye can be totally solubilized in a resin without causing dispersion problems. On the other hand, a pigment can only be dispersed in a resin, and therefore, the particle size of the pigment typically cannot be greater than 0.2 μm. The amount of the coloring agent depends on the desired color hue. Preferably, the amount of the coloring agent should constitute about 3–70 wt %, or more preferably about 5–60 wt %, of the total solid.

In the second preferred embodiment which utilizes electrodeposition technique and a lined (or striped) pattern, negative photoresists can also be used in the place of the positive photoresists mentioned above. Preferred negative photoresists can be formed which contains a conventional acrylic resin, an epoxy resin, a photopolymerization initiator, and a photo-curing agent.

Preferably, the permanent insulation films are negative photosensitive compositions containing: (1) a resin binder containing a carboxyl (COOH) group; (2) 1–15 wt %, based on the weight of the resin binder, of a photopolymerization initiator; (3) 30–100 wt % of a photo reactive monomer or oligomer each containing at least two unsaturated double bonds. The resin binder is a thermoplastic polymer having a weight average molecular weight between 10,000–1,000,000, or mixture thereof, and is soluable in a basic developer solution. The resin binder is preferably an acrylic copolymer or an acrylic acid- or acid anhydride-modified novolac resin. The acrylic copolymers preferably are those that are prepared from a monomer composition containing a monomer that contains an acid group, such as acrylic acid or methacrylic acid, or a monomer that does not contain an acid group, such as hexyl acrylate, butyl acrylate, ethyl acrylate, methyl acrylate, benzyl acrylate, benzyl methacrylate, phenoxy ethyl acrylate, phenoxy ethyl methacrylate, or hydroxy ethyl acrylate.

The acrylic acid- or acid anhydride-modified novolac resin are those polymeric derivatives prepared from a novolac resin and an acrylic acid and/or an acid anhydride. Preferred novolac resins include Araldite ECN-1299 (made by CIBA-GEIGY AG), Quatex 3710 (made by E. I. DuPont de Numours Co.), ESCN-200 and ESCN-220 (by Sumitomo Chemical Co), and YDCN-220H (by Toto Chemical Co.). These novolac resins are epoxy novolac resins with weight average molecular weight of about 1,300 and are derived from ortho-cresol-formaldehyde novolac which is then reacted with epichlorohydrin to form a polyepoxide. Preferred acrylic acids include acrylic acid and methacrylic acid. Preferred acid anhydrides include maleic anhydride, succinic anhydride, itaconic anhydride, phthalic anhydride, tetrahydrophthalic anhydride, trimellitic anhydride, and pyromellitic anhydride. Preferred photopolymerization initiators include benzophenone, benzocyclobutanone, benzoin methyl ether, benzoquinone, and methylanthraquinone. Preferred multiple-double-bond photoreactive monomers or oligomers include butanediol diacrylate, hexanediol diacrylate, ethylene glycol diacrylate, polyethylene glycol diacrylate, trimethylopropane triacrylate, pentacrythritol triacrylate, and dipehtacrythritol polyacrylate. Derivatives of novolac resins are preferred because of their relatively wide process window (allowing high process tolerance), and high hardness after curing (4H–16H). The high hardness of the permanent insulation film enhances the mechanical strength of the assembled LCD panels.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Preparation of Positive Photoresist A

A positive photoresist was prepared which contained a mixture of (1) 100 parts by weight of a novolac resin, having a nominal (weight-average) molecular weight of 40,000 prepared from a monomer composition of phenol/formaldehyde=1:0.82; (2) 25 parts by weight of a photoactive compound, 2,3,4-trihydroxy benzophenone/naphthoquinone diazide-5-sulsonyl chloride (½.0); and (3) 360 parts by weight of cellosolve acetate.

EXAMPLE 2

Preparation of an Anionic Red-Colored Resin

A red-colored resin was prepared which contained: (1) 100 parts by weight of an anionic resin; (2) 10 parts by weight of-n-butanol; (3) 20 pans by weight of isopropanol; (4) 1,635 pans by weight of deionized water; (5) 100% of trimethylamine required for neutralization; and (6) 70 parts by weight of C.I. pigment red 177. The anionic resin was prepared from a monomeric composition containing 104 g of methyl methacrylate, 72 g of acrylic acid, 177 g of hydroxy ethyl acrylate, 150 g of ethyl acrylate, and 503 g of cellosove acetate.

EXAMPLE 3

Preparation of an Anionic Green-Colored Resin

A green-colored resin was prepared which contained: (1) 100 parts by weight of an anionic resin; (2) 10 parts by weight of n-butanol; (3) 20 pans by weight ofisopropanol; (4) 1,655 parts by weight of deionized water; (5) 100% of trimethylamine required for neutralization; and (6) 70 pans by weight of C.I. pigment green 7. The anionic resin was prepared from a monomeric composition containing 104 g of methyl methacrylate, 72 g of acrylic acid, 177 g of hydroxy ethyl acrylate, 150 g of ethyl acrylate, and 503 g of cellosove acetate.

EXAMPLE 4

Preparation of an Anionic Blue-Colored Resin

A blue-colored resin was prepared which contained: (1) 100 parts by weight of an anionic resin; (2) 10 parts by weight of n-butanol; (3) 20 parts by weight of isopropanol; (4) 1,545 parts by weight of deionized water; (5) 100% of trimethylamine required for neutralization; and (6) 50 parts by weight of C.I. pigment blue 15:3. The anionic resin was prepared from a monomeric composition containing 104 g of methyl methacrylate, 72 g of acrylic acid, 177 g of hydroxy ethyl acrylate, 150 g of ethyl acrylate, and 503 g of cellosove acetate.

EXAMPLE 5

Preparation of a Cationic Red-Coloerd Resin

A red-colored resin was prepared which contained: (1) 100 parts by weight of a cationic resin; (2) 10 parts by weight of n-butanol; (3) 20 parts by weight of isopropanol; (4) 1,635 parts by weight of deionized water; (5) 100% of acetic acid required for neutralization; and (6) 60 parts by weight of C.I. pigment red 177. The cationic resin was prepared from a monomeric composition containing 104 g of methyl methacrylate, 80 g of N,N,-dimethyl acrylamine, 177g of hydroxy ethyl acrylate, 160 g of butyl acrylate, and 500 g of cellosove acetate.

EXAMPLE 6

Preparation of a Cationic Green-Colored Resin

A green-colored resin was prepared which contained: (1) 100 parts by weight of a cationic resin; (2) 10 parts by weight of n-butanol; (3) 20 parts by weight of isopropanol; (4) 1,655 parts by weight of deionized water; (5) 100% of acetic acid required for neutralization; and (6) 70 parts by weight of C.I. pigment green 7. The cationic resin was prepared from a monomeric composition containing 104 g of methyl methacrylate, 80 g of N,N-dimethyl acrylamine, 177 g of hydroxy ethyl acrylate, 160 g of butyl acrylate, and 500 g of cellosove acetate.

EXAMPLE 7

Preparation of a Cationic Blue-Colored Resin

A blue-colored resin was prepared which contained: (1) 100 parts by weight of a cationic resin; (2) 10 parts by weight of n-butanol; (3) 20 parts by weight of isopropanol; (4) 1,545 parts by weight of deionized water; (5) 100% of acetic acid required for neutralization; and (6) 50 parts by weight of C.I. pigment blue 15:3. The cationic resin was prepared from a monomeric composition containing 104 g of methyl methacrylate, 80 g of N,N,-dimethyl acrylamine, 177 g of hydroxy ethyl acrylate, 160 g of butyl acrylate, and 500 g of cellosove acetate.

EXAMPLE 8

Preparation of Acid Anhydride-Modified Novolac Resin

A four-mouth reactor having a thermometer, condenser, a feed inlet, and a stirrer inserted therein was placed into an oil bath. When the temperature of the reactor reached 110° C., 1,609.0 g of CBA (carbitol acetate) was added. Then, 2,050.0 g of ESCN200 was added in several batches into the reactor. The rate of addition should not be too fast so as to cause coagulation. After the ESCN220 was totally dissolved, the reactor temperature was reduced to 80° C. Then, 3.1 g of MEHQ (methoxy hydroquinone) and 792.0 g of AA (acrylic acid) were added, and air was introduced into the reactor at a rate of 0.2 liter/rain, while a stirring speed of 350 rpm was maintained. The temperature of the cooling water was −5° C. After the reactants were uniformly dispersed, 15.0 g of BDMA (benzyl dimethylamine) and 10.0 g of TEBAC. (triethyl butyl ammonium chloride) were added, and the reactor temperature was maintained at 80° C. After 5 hours, the reactor temperature was raised to 110° C. and reaction continued for 12 hours. If the viscosity of the reaction mixture was too high, about 0.6 g of Modaflow 2100 can be added to reduce viscosity and burst foams, so as to improve dispersion of air in the reaction solution.

After the reaction involving the epoxy resin was completed, 913.0 g of phthalic anhydride and 413.0 g of 150 were added, and reaction continued at 110° C. for 8 hours. After the reactor temperature was cooled to 70° C., 0.62 g of MEHQ was added. After thorough stirring, the reaction product, which was a phthalic anhydride-modified novolac resin and had a red-brownish color, was obtained.

EXAMPLE 9

Preparation of Ppermnent Insulation Film Composition

An insulation film composition was prepared which contained 100 g of the modified novolac resin from Example 8, 20 g of pentaerythritol triacrylate, 1 g of methylanthraquinone, and 100 g of cyclohexanone.

EXAMPLE 10

Preparation of Color Filter

A layer of black-hued photoresist, JSR Black 301, was coated on an ITO conductive glass substrate 1.1 mm thick and with a resistivity of 15 $\Omega/cm^2$ using a spinning coating method. After soft baking at 80° C. for 5 minutes, the ITO was subject to a photo exposure of 200 $mJ/cm^2$ via a photomask, which was provided with an exposure pattern containing alignment marks, a rectangular frame, and a matrix (i.e., with a latticed pattern). The exposed area was developed with a 0.1% $Na_2SiO_3$ developer solution, and removed from the ITO substrate with water. The remaining black-hued photoresist was then hard baked at 200° C. for 30 minutes. This is called an alignment-exposure procedure.

After the temperature was cooled to room temperature, an insulation film prepared from Example 9 was coated, using a spinning coating method, on the entire ITO substrate, including the black matrix. The insulation film was first soft baked at 80° C. for 5 minutes, then exposed, via a positive photomask having a conjugate exposure pattern (i.e., allowing photo exposure to be obtained at areas outside the black frame that are intended to be covered by the color layers and the black matrix), and developed. The photomask also allowed the areas containing electrodes to be revealed so as to subsequent electrodeposition to be conducted. After hard baking at 200° C., the insulation film was measured to have a pencil hardness of 5H.

A three-level positive photoresist A obtained from Example 1 was coated on the ITO substrate, using the spinning coating method. After soft baking at 80° C. for 5 minutes, a photomask as shown in FIG. 2A was used to form three regions of different levels of exposure energy corresponding to the positions of the red, green, and blue color pixels, via precise movements of the photomask. The three levels of exposure energy were 100 $mJ/cm^2$, 400 $mJ/cm^2$, and 750 $mJ/cm^2$, respectively. The exposed photoresist A was first developed with a 0.1% $Na_2SO_3$ solution to reveal the 750 $mJ/cm^2$ exposure energy region, which was then electrodeposited with the cationic red-colored resin prepared in Example 5. After soft baking at 80° C. for 10 minutes, the development/electrodeposition steps were repeated twice, first using 0.5% $Na_2SO_3$ solution and the green-colored resin obtained from Example 6, then using 1% $Na_2SO_3$ solution and the blue-colored resin obtained from Example 7. After hard baking at 200° C. for 30 minutes, a protective film (JSR type, OPTMEss6600) was coated on the entire ITO layer, which was again soft baked at 80° C. for 5 minutes and hard baked at 200° C. for 300 minutes, to obtain a color filter.

EXAMPLE 11

Preparation of a Color Filter

Figure 4:
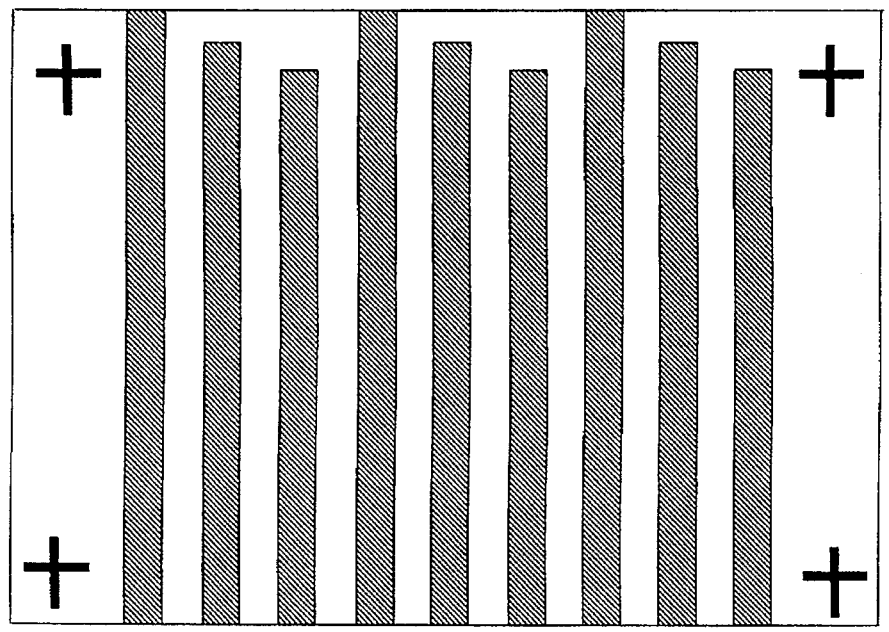
FIG. 4 is a schematic diagram of a photomask for forming the multiple-lined pattern (i.e., a stripe pattern) on the ITO layer; the shaded area indicates the masked region.
Figure 5:
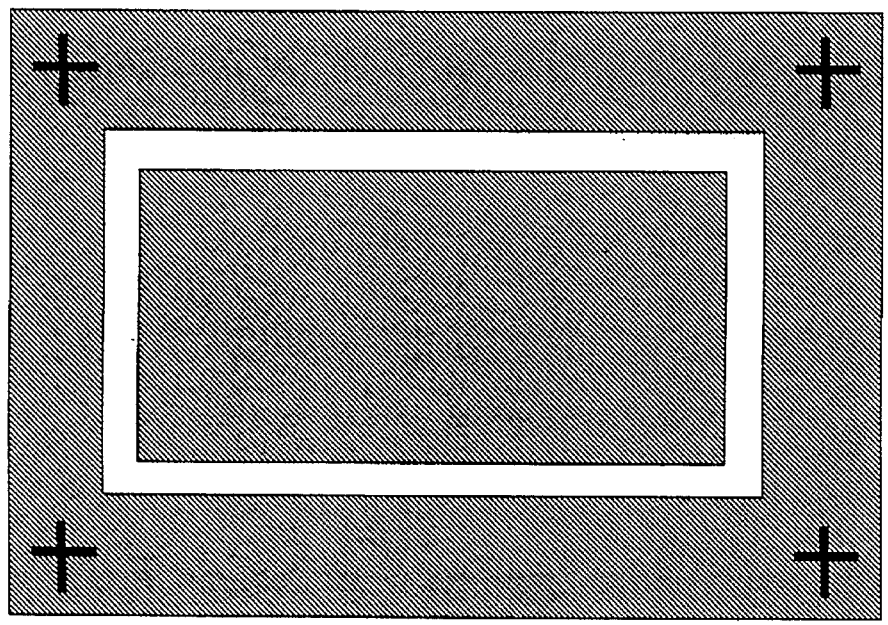
FIG. 5 is a schematic diagram of a photomask for forming an insulation layer on a conductive substrate for use in an electrodeposition process; the shaded area indicates the masked region.

A layer of positive photoresist A obtained from Example 1 was coated on an ITO conductive glass substrate 1.1 mm thick and with a resistivity of 15 $\Omega/cm^2$ using a spinning coating method. After soft baking at 80° C. for 5 minutes, a photomask, as shown in FIG. 4, was used to expose and selectively develop the photoresist layer. An acid solution (containing 1 part $HNO_3$, 3 parts HCl, and 4 parts water) was used to remove the portions of the ITO layer not protected by the remaining photoresist. Thereafter, a 1% NaOH solution was used to remove the remaining photoresist. This caused the remaining ITO layer to exist as a lined pattern, with alignment marks. Then, utilizing an alignment-exposure procedure similar to that described in Example 10, a black-hued layer containing a frame and a latticed matrix and alignment marks was formed on the ITO layer. Likewise, a 5 mm wide rectangular permanent insulation film, with a measured hardness of 5H, was formed on the ITO layer.

After the insulation film was permanently formed on the ITO layer, anionic colored resins obtained from Examples 2 through 4 were respectively deposited onto the ITO layer. Finally, a protective film similar to that described in Example 10 was coated on the entire substrate, to obtain a color filter.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for making color filters by electrodeposition or lithographic electrodeposition of a plurality of colored resins on an electrically conductive substrate, said method comprising the steps of:
   (a) dividing said substrate into an intended zone and a conjugate zone, wherein said intended zone consists of portions of said substrate to be deposited with said colored resins and said conjugate zone consists of portions of said substrate not to be deposited with said colored resins; and
   (b) forming a permanent insulation film on said conjugate zone of said substrate prior to electrodepositing said colored resins onto said intended zone of said substrate;
   (c) wherein said permanent insulation film is formed on said conjugate zone according to the following steps:
      (i) coating a photosensitive insulation film on said substrate;
      (ii) subjecting said photosensitive insulation film to a masked exposure using a photomask;
      (iii) developing said photosensitive insulation film into a developed insulation film, wherein said photomask is provided such that only said conjugate zone of said insulation film will remain on said substrate; and
      (iv) curing said remaining insulation film to form a permanent insulation film on said conjugate zone of said substrate:
   (d) further wherein said photosensitive insulation resin is a negative photosensitive resin containing:
      (i) a resin binder containing a carboxyl (COOH) group;
      (ii) 1–15 wt %, based on the weight of said resin binder, of a photopolymerization initiator; and
      (iii) 30–100 wt %, based on the weight of said resin binder, of a photo-reactive monomer or oligomer.

2. A method for making color filters according to claim 1 wherein said resin binder is an acrylic copolymer prepared from a monomer composition containing acrylic acid or methacrylic acid.

3. A method for making color filters according to claim 1 wherein said resin binder is an acrylic copolymer prepared from a monomer composition containing an acrylate selected from the group consisting of hexyl acrylate, butyl acrylate, ethyl acrylate, methyl acrylate, benzyl acrylate, benzyl methacrylate, phenoxy ethyl acrylate, phenoxy ethyl methacrylate, hydroxy ethyl acrylate, and mixtures thereof.

4. A method for making color filters according to claim 1 wherein said resin binder is an acrylic-acid-modified or acid-anhydride-modified novolac resin.

5. A method for making color filters according to claim 4 wherein said acid anhydride is selected from the group consisting of maleic anhydride, succinic anhydride, itaconic anhydride, phthalic anhydride, tetrahydrophthalic anhydride, trimellitic anhydride, and pyromellitic anhydride.

6. A method for making color filters according to claim 1 wherein said photopolymerization initiator is selected from the group consisting of benzophenone, benzocyclobutanone, benzoin methyl ether, benzoquinone, and methylanthraquinone.

7. A method for making color filters according to claim 1 wherein said photoreactive monomer or oligomer is selected from the group consisting of butanediol diacrylate, hexanediol diacrylate, ethylene glycol diacrylate, polyethylene glycol diacrylate, trimethylopropane triacrylate, pentacrythritol triacrylate, and dipehtacrythritol polyacrylate.

8. A method for making color filters according to claim 1 which further comprises the step of forming a black-hued pattern on said substrate prior to the formation of said permanent insulation film, said black-hued pattern contains a black matrix, a rectangularly shaped outer frame, and one or more alignment marks.

9. A method for making color filters according to claim 8 wherein said black-hued pattern is formed by the steps of:
   (a) coating a layer of positive or negative black-hued photo-curable resin on said substrate; and
   (b) developing said black-hued pattern via a masked exposure and solvent development.

10. A method for making color filters according to claim 8 wherein said black-hued pattern is formed by the steps of:
    (a) coating said substrate with a positive or negative photoresist layer;
    (b) using a masked exposure and solvent development to expose an exposed area corresponding to said black-hued pattern;
    (c) electrodepositing a black-hued resin onto said exposed area; and
    (d) curing said black-hued resin.

11. A method for making color filters according to claim 8 wherein said black-hued pattern is formed by the steps of:
    (a) coating said substrate with a positive or negative photoresist layer;
    (b) using a masked exposure and solvent development to expose a revealed area on said substrate corresponding to said black-hued pattern; and
    (c) electrodepositing a metal component onto said revealed area, said metal component is selected from the group consisting of chromium, nickel, and alloys thereof.

12. A method for making color filters according to claim 1 wherein said conductive substrate comprises a transparent electrically conductive film formed on a glass substrate.

13. A method for making color filters according to claim 12 wherein said transparent electrically conductive film contains indium-tin oxide.

14. A method for making color filters by electrodeposition or lithographic electrodeposition of a plurality of colored resins on an electrically conductive substrate, said method comprising the steps of:
    (a) forming a black-hued pattern on said substrate, said black-hued pattern contains a black matrix, a rectangularly shaped outer frame, and one or more alignment marks;
    (b) dividing said substrate into an intended zone and a conjugate zone, said intended zone being portions of said substrate to be deposited with said colored resins and said conjugate zone being portions of said substrate not to be deposited with said colored resins;
    (c) forming a permanent insulation film on said conjugate zone of said substrate; and
    (d) electrodepositing said colored resins onto said intended zone of said substrate;
    (e) wherein said photosensitive insulation resin is a negative photosensitive resin containing:
        (i) a resin binder containing a carboxyl (COOH) group;
        (ii) 1–15 wt %, based on the weight of said resin binder, of a photopolymerization initiator; and
        (iii) 30–100 wt %, based on the weight of said resin binder, of a photo-reactive monomer or oligomer each containing at least two unsaturated double bonds.

15. A method for making color filters according to claim 14 wherein said resin binder is an acid anhydride modified novolak resin.

16. A method for making color filters according to claim 15 wherein said acid anhydride is selected from the group consisting of maleic anhydride, succinic anhydride, itaconic anhydride, phthalic anhydride, tetrahydrophthalic anhydride, trimellitic anhydride, and pyromellitic anhydride.

* * * * *